US012752379B2

(12) United States Patent
Watanabe et al.

(10) Patent No.: US 12,752,379 B2
(45) **Date of Patent: *Oct. 6, 2026**

(54) TIG WELDED JOINT

(71) Applicant: JFE STEEL CORPORATION, Tokyo (JP)

(72) Inventors: Kazufumi Watanabe, Tokyo (JP); Atsushi Takada, Tokyo (JP); Akiyoshi Ando, Tokyo (JP); Takatoshi Okabe, Tokyo (JP); Keiji Ueda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 540 days.

This patent is subject to a terminal disclaimer.

(21) Appl. No.: 18/277,837

(22) PCT Filed: Feb. 28, 2022

(86) PCT No.: PCT/JP2022/008118

§ 371 (c)(1),
(2) Date: Aug. 18, 2023

(87) PCT Pub. No.: WO2022/186097

PCT Pub. Date: Sep. 9, 2022

(65) Prior Publication Data

US 2024/0131632 A1 Apr. 25, 2024
US 2024/0227088 A9 Jul. 11, 2024

(30) Foreign Application Priority Data

Mar. 1, 2021 (JP) ................................ 2021-031517

(51) Int. Cl.

| | |
|---|---|
| ***B23K 35/30*** | (2006.01) |
| ***B23K 9/167*** | (2006.01) |
| ***B23K 35/00*** | (2006.01) |
| ***C22C 38/00*** | (2006.01) |
| ***C22C 38/02*** | (2006.01) |
| ***C22C 38/06*** | (2006.01) |
| ***C22C 38/38*** | (2006.01) |

(52) U.S. Cl.

CPC .......... *B23K 35/3073* (2013.01); *B23K 9/167* (2013.01); *B23K 35/004* (2013.01); *C22C 38/001* (2013.01); *C22C 38/002* (2013.01); *C22C 38/02* (2013.01); *C22C 38/06* (2013.01); *C22C 38/38* (2013.01)

(58) Field of Classification Search

CPC ...... B23K 9/0052; B23K 9/028; B23K 9/164; B23K 9/167; B23K 9/23; B23K 2101/12; B23K 35/3073

See application file for complete search history.

(56) References Cited

U.S. PATENT DOCUMENTS

| | | | | |
|---|---|---|---|---|
| 2016/0271736 | A1* | 9/2016 | Han | C22C 38/54 |
| 2016/0271740 | A1* | 9/2016 | Lee | C22C 38/58 |
| 2018/0021895 | A1 | 1/2018 | Wasson et al. | |
| 2020/0086431 | A1 | 3/2020 | Wasson et al. | |
| 2020/0239986 | A1* | 7/2020 | Hirata | B23K 35/30 |
| 2020/0392611 | A1* | 12/2020 | Jotoku | C22C 38/001 |
| 2021/0323101 | A1 | 10/2021 | Takada et al. | |

FOREIGN PATENT DOCUMENTS

| | | | | |
|---|---|---|---|---|
| CN | 101652492 | A | 2/2010 | |
| CN | 104797730 | A | 7/2015 | |
| CN | 107009046 | A | 8/2017 | |
| CN | 108971795 | A | 12/2018 | |
| EP | 2130937 | A1 | 12/2009 | |
| EP | 3 686 306 | A1 | 7/2020 | |
| JP | H10166179 | A | 6/1998 | |
| JP | 2016-196703 | A | 11/2016 | |
| JP | 2017-502842 | A | 1/2017 | |
| JP | 2017-071817 | A | 4/2017 | |
| JP | 2019-520473 | A | 7/2019 | |
| KR | 10-2016-0078621 | A | 7/2016 | |
| KR | 20160078921 | A | 7/2016 | |
| KR | 20200072327 | A * | 6/2020 | C22C 38/04 |
| KR | 20200123831 | A | 10/2020 | |
| WO | 2020/039643 | A1 | 2/2020 | |
| WO | 2020/166538 | A1 | 8/2020 | |
| WO | 2020/203334 | A1 | 10/2020 | |
| WO | 2020/203335 | A1 | 10/2020 | |

OTHER PUBLICATIONS

English translation of KR 20200072327 (Year: 2020).*
Dec. 9, 2024 Extended European Search Report issued in European Patent Application No. 22763153.8.
Sep. 30, 2025 Office Action issued in Chinese Patent Application No. 202280016961.4.
May 17, 2022 International Search Report issued in International Patent Application No. PCT/JP2022/008118.
Jan. 8, 2026 Office Action issued in Chinese Patent Application No. 202280016961.4.
Jul. 9, 2025 Office Action issued in Korean Patent Application No. 10-2023-7027966.
Feb. 26, 2026 Office Action issued in U.S. Appl. No. 18/277,833.
Mar. 30, 2026 Office Action issued in Korean Patent Application No. 10-2023-7027966 with concise statement of relevance.

* cited by examiner

*Primary Examiner* — Scott J Walthour
(74) *Attorney, Agent, or Firm* — Oliff PLC

(57) ABSTRACT

A TIG welded joint in a high-Mn content steel material that can be formed with reduced occurrence of hot cracking during the welding process and has high strength and excellent cryogenic impact toughness. In the TIG welded joint, the high-Mn content steel material has a chemical composition including, by mass %, C: 0.10 to 0.80%, Si: 0.05 to 1.00%, Mn: 18.0 to 30.0%, P: 0.030% or less, S: 0.0070% or less, Al: 0.010 to 0.070%, Cr: 2.5 to 7.0%, N: 0.0050 to 0.0500%, and O: 0.0050% or less, the balance being Fe and incidental impurities, and a weld metal has a chemical composition including C: 0.10 to 0.80%, Si: 0.05 to 1.00%, Mn: 15.0 to 30.0%, P: 0.030% or less, S: 0.030% or less, Al: 0.100% or less, Cr: 6.0 to 14.0%, and N: 0.100% or less, the balance being Fe and incidental impurities.

16 Claims, No Drawings

TIG WELDED JOINT

TECHNICAL FIELD

This application relates to a TIG (tungsten inert gas) welded joint, particularly, to a welded joint in a steel structure for cryogenic environment use that is formed by welding of a high-Mn content steel material and that is resistant to the occurrence of hot cracking during the welding process and has high strength and excellent cryogenic impact toughness.

BACKGROUND

Tungsten inert gas welding, TIG welding, is a process in which a metal is welded by melting a filler metal (a welding rod) in an arc using a non-consumable tungsten electrode rod while blowing an inert gas, such as argon gas or helium gas, to shield the welding from air. This TIG welding is applicable to various materials, such as alloy steels and non-ferrous metals, can further weld even complicated shapes, and offers excellent weld quality, thus being used in various metal welding applications.

Environmental regulations are more rigorous in recent years. Under such circumstances, the demand is increasing for liquefied natural gas (hereinafter, also written as LNG) that does not contain sulfur and is thus regarded as a clean fuel without emission of air pollutants, such as sulfoxides. To ensure that LNG can be transported or stored, LNG transportation or storage containers (tanks) are required to maintain excellent cryogenic impact toughness at or below a temperature of −162° C. that is the liquefaction temperature of LNG.

To satisfy excellent cryogenic impact toughness that is required, for example, aluminum alloys, 9% Ni steel, and austenite stainless steel are conventionally used as materials for containers (tanks) for the above and other purposes.

However, aluminum alloys have low tensile strength and entail increasing of the wall thickness of a structure that is designed. Aluminum alloys are also low in weldability. Furthermore, 9% Ni steel is economically disadvantageous because an expensive Ni-based material should be used as the welding material. Furthermore, austenite stainless steel has drawbacks in that it is expensive, and the strength of the base material is low.

Due to these problems, recent studies of materials for LNG transportation or storage containers (tanks) are directed to high-Mn content steel containing about 10 to 35% Mn in terms of mass % (hereinafter, also written as "high-Mn steel"). High-Mn steel is characterized in that the steel has an austenite phase even at a cryogenic temperature and does not undergo brittle fracture, and also in that the steel has high strength compared with austenite stainless steel. Thus, there are demands for the development of welding materials capable of stably welding such high-Mn content steel materials.

To meet such demands, for example, Patent Literature 1 discloses a "cryogenic high-Mn steel material". The "cryogenic high-Mn steel material" disclosed in Patent Literature 1 is such that the steel material contains, by mass %, C: 0.001 to 0.80%, Mn: 15.0 to 35.0%, S: 0.001 to 0.01%, Cr: 0.01 to 10.0%, Ti: 0.001 to 0.05%, N: 0.0001 to 0.10%, and O: 0.001 to 0.010%; the P content is limited to P: 0.02% or less; the steel material further contains one or both of Si: 0.001 to 5.00% and Al: 0.001 to 2.0%, and further contains one, or two or more of Mg: 0.01% or less, Ca: 0.01% or less, and REM: 0.01% or less in a total content of 0.0002% or more; the steel material satisfies 30C+0.5Mn+Ni+0.8Cr+1.2Si+0.8Mo≥25 . . . (Formula 1) and O/S≥1 . . . (Formula 2); the balance is Fe and incidental impurities; the austenite volume fraction is 95% or more; the austenite grain size is 20 to 200 μm; and the carbide coverage ratio at austenite grain boundaries is 50% or less. In the high-Mn steel material disclosed in Patent Literature 1, the austenite grain size is controlled to an appropriate size to ensure that carbides that have occurred at grain boundaries will not serve as fracture origins or as cracking propagation pathways. The austenite grain size is appropriately controlled by appropriately controlling the amounts of the alloying elements as well as the balance thereof, and further by appropriately controlling the amounts of S and O and by adding Mg, Ca, and REM. The literature describes that this control can also reduce the coarsening of the grain size in welded heat affected zones.

Furthermore, Patent Literature 2 discloses a "cryogenic steel plate". The "cryogenic steel plate" disclosed in Patent Literature 2 is such that the steel plate contains, by mass %, C: 0.30 to 0.65%, Si: 0.05 to 0.30%, Mn: more than 20.00% and less than 30.00%, Ni: 0.10% or more and less than 3.00%, Cr: 3.00% or more and less than 8.00%, Al: 0.005 to 0.100%, and N: 0.0050% or more and less than 0.0500%; the P, S, and O contents are limited to P: 0.0040% or less, S: 0.020% or less, and O: 0.0050% or less; the balance is Fe and impurities; the Mn segregation ratio XMn (XMn=Mn1/Mn0) calculated from the Mn concentration Mn1 at a Mn-rich portion and the Mn concentration Mn0 at a Mn-poor portion is 1.6 or less; the yield stress and the tensile stress at room temperature (25° C.) are 400 MPa or more and 800 MPa or more, respectively; and the Charpy impact absorbed energy ($vE_{-196}$) of a welded heat affected zone is 70 J or more. According to the technique described in Patent Literature 2, the steel plate as hot-rolled can be provided as a material for LNG transportation or storage containers (tanks).

Furthermore, Patent Literature 3 discloses a "high-strength welded joint having excellent cryogenic impact toughness" and a "flux-cored arc welding wire for the welded joint". The "flux-cored arc welding wire" disclosed in Patent Literature 3 is a wire that has a composition including, by wt %, C: 0.15 to 0.8%, Si: 0.2 to 1.2%, Mn: 15 to 34%, Cr: 6% or less, Mo: 1.5 to 4%, S: 0.02% or less, P: 0.02% or less, B: 0.01% or less, Ti: 0.09 to 0.5%, N: 0.001 to 0.3%, $TiO_2$: 4 to 15%, a total of one or more selected from $SiO_2$, $ZrO_2$, and $Al_2O_3$: 0.01 to 9%, a total of one or more selected from K, Na, and Li: 0.5 to 1.7%, and one or more of F and Ca: 0.2 to 1.5%, the balance being Fe and incidental impurities. Patent Literature 3 describes that welding with the flux-cored arc welding wire disclosed therein can effectively produce a welded joint that has excellent low-temperature toughness with an absorbed energy of 27 J or more in a Charpy impact test at a test temperature of −196° C. and has high strength with a room-temperature tensile strength of more than 400 MPa. Furthermore, it is described that the welded joint can attain excellent hot cracking resistance by virtue of the Mo content in the wire composition being controlled to Mo: 1.5% or more.

Furthermore, Patent Literature 4 discloses a "gas metal arc welding solid wire". The "gas metal arc welding solid wire" disclosed in Patent Literature 4 is a wire that has a composition including, by mass %, C: 0.2 to 0.8%, Si: 0.15 to 0.90%, Mn: 17.0 to 28.0%, P: 0.03% or less, S: 0.03% or less, Ni: 0.01 to 10.00%, Cr: 0.4 to 4.0%, Mo: 0.01 to 3.50%, B: less than 0.0010%, and N: 0.12% or less, the balance being Fe and incidental impurities. Where necessary, the wire may contain one, or two or more selected from V, Ti, and Nb, and one, or two or more selected from Cu, Al, Ca, and REM. Patent Literature 4 describes that welding with the gas metal arc welding solid wire disclosed therein generates less fume and can produce a high-strength welded joint that has high strength with a room-temperature yield strength (0.2% proof stress) of 400 MPa or more and has excellent cryogenic impact toughness with an absorbed energy $vE_{-196}$ of 28 J or more in a Charpy impact test at a test temperature of −196° C.

CITATION LIST

Patent Literature

PTL 1: Japanese Unexamined Patent Application Publication No. 2016-196703
PTL 2: Japanese Unexamined Patent Application Publication No. 2017-071817
PTL 3: Japanese Unexamined Patent Application Publication (Translation of PCT Application) No. 2017-502842
PTL 4: WO 2020/039643

SUMMARY

Technical Problem

However, studies by the inventors have shown that hot cracking occurs during TIG welding of workpieces of the high-Mn steel material described in Patent Literature 1 or 2 with the welding wire described in Patent Literature 3 or 4.

An object of the disclosed embodiments is to solve the problems in the art discussed above and provide a TIG welded joint that can be formed with reduced occurrence of hot cracking during the welding process and has not only high strength but also excellent cryogenic impact toughness to favorably serve as a welded joint for high-Mn content steel materials used in cryogenic environments.

The term "high strength" as used herein means that a weld metal prepared in accordance with the requirements specified in JIS Z 3111 has a yield strength (a 0.2% proof stress) of 400 MPa or more and a tensile strength of 660 MPa or more at room temperature (25° C.), and also means that a welded joint prepared in accordance with the requirements specified in JIS Z 3121 has a tensile strength of 660 MPa or more at room temperature (25° C.).

The term "excellent cryogenic impact toughness" means that a welded joint prepared in accordance with the requirements specified in JIS Z 3128 has an absorbed energy $vE_{-196}$ of 28 J or more in a Charpy impact test at a test temperature of −196° C. with respect to a weld metal and a heat-affected zone of the welded joint.

Solution to Problem

In order to achieve the above object, the inventors carried out extensive studies first on factors that would affect hot cracking during TIG welding. As a result, the inventors have found that one of the factors giving rise to hot cracking is the segregation of P into the last-solidified region of the weld metal. In addition, the inventors have found that the P segregation into the last-solidified region of the weld metal can be suppressed and further the occurrence of hot cracking can be reduced by introducing 6.0 mass % or more Cr into the weld metal to ensure that chromium forms Cr phosphide in the weld metal in the liquid phase state.

The inventors next studied a steel composition and a weld metal composition that would be necessary for a welded joint prepared by TIG welding in accordance with the requirements specified in JIS Z 3121 to attain desired high strength and desired excellent cryogenic impact toughness at the same time. As a result, the inventors have found that a TIG welded joint needs to be designed so that it involves a high-Mn content steel material having a chemical composition that is controlled to the ranges of, by mass %, C: 0.10 to 0.80%, Si: 0.05 to 1.00%, and Mn: 18.0 to 30.0%, has a P content and a S content lowered to P: 0.030% or less and S: 0.0070% or less, is further controlled to the specific ranges of Al: 0.010 to 0.070%, Cr: 2.5 to 7.0%, and N: 0.0050% to 0.0500%, and has an O content lowered to O (oxygen): 0.0050% or less, and further so that the weld metal formed by TIG welding has a chemical composition that is controlled to the ranges of, by mass %, C: 0.10 to 0.80%, Si: 0.05 to 1.00%, and Mn: 15.0 to 30.0%, has a P content, a S content, and an Al content lowered to P: 0.030% or less, S: 0.030% or less, and Al: 0.100% or less, is further controlled to the specific range of Cr: 6.0 to 14.0%, and has a N content lowered to N: 0.100% or less.

The disclosed embodiments have been completed based on the above findings and further studies.

A summary of the disclosed embodiments is as follows.

[1] A TIG welded joint in a high-Mn content steel material, wherein the high-Mn content steel material has a chemical composition including, by mass %,
C: 0.10 to 0.80%,
Si: 0.05 to 1.00%,
Mn: 18.0 to 30.0%,
P: 0.030% or less,
S: 0.0070% or less,
Al: 0.010 to 0.070%,
Cr: 2.5 to 7.0%,
N: 0.0050 to 0.0500%, and
O: 0.0050% or less, the balance being Fe and incidental impurities, and
a weld metal has a chemical composition including, by mass %,
C: 0.10 to 0.80%,
Si: 0.05 to 1.00%,
Mn: 15.0 to 30.0%,
P: 0.030% or less,
S: 0.030% or less,
Al: 0.100% or less,
Cr: 6.0 to 14.0%, and
N: 0.100% or less, the balance being Fe and incidental impurities.

[2] The TIG welded joint described in [1], wherein the chemical composition of the high-Mn content steel material further includes, by mass %, one, or two or more selected from:

Mo: 2.00% or less,
V: 2.0% or less, and
W: 2.00% or less.

[3] The TIG welded joint described in [1] or [2], wherein the chemical composition of the high-Mn content steel material further includes, by mass %, one or two selected from:

REM: 0.0010 to 0.0200%, and
B: 0.0005 to 0.0020%.

[4] The TIG welded joint described in any one of [1] to [3], wherein the high-Mn content steel material has a yield strength (a 0.2% proof stress) of 400 MPa or more in a tensile test at room temperature and a Charpy impact absorbed energy $vE_{-196}$ of 28 J or more at a test temperature of −196° C.

[5] The TIG welded joint described in any one of [1] to [4], wherein the chemical composition of the weld metal further includes, by mass %, one or two selected from:

Mo: 3.50% or less, and

Ni: 10.00% or less.

[6] The TIG welded joint described in any one of [1] to [5], wherein the chemical composition of the weld metal further includes, by mass %, one, or two or more selected from:

V: 1.60% or less,

Ti: 1.00% or less,

Nb: 1.00% or less, and

W: 1.00% or less.

[7] The TIG welded joint described in any one of [1] to [6], wherein the chemical composition of the weld metal further includes, by mass %, one, or two or more selected from:

Cu: 1.00% or less,

Ca: 0.010% or less,

B: 0.010% or less, and

REM: 0.020% or less.

[8] The TIG welded joint described in any one of [1] to [7], wherein the weld metal has a yield strength (a 0.2% proof stress) of 400 MPa or more and a tensile strength of 660 MPa or more in a tensile test at room temperature, the welded joint has a tensile strength of 660 MPa or more at room temperature, and the weld metal and a heat-affected zone in the welded joint have a Charpy impact absorbed energy $vE_{-196}$ of 28 J or more at a test temperature of −196° C.

Advantageous Effects

The disclosed embodiments can reduce the occurrence of hot cracking in a welded joint during TIG welding of a high-Mn content steel material and allows for easy production of a TIG welded joint portion having high strength and excellent cryogenic impact toughness, thus attaining significant effects in industry.

DETAILED DESCRIPTION

The disclosed embodiments pertain to a TIG welded joint that is suited as a joint in a cryogenic steel material formed by TIG welding of workpieces of a high-Mn content steel material. The welded joint of the disclosed embodiments is a welded joint prepared by TIG welding that may be evaluated in accordance with the requirements specified in JIS Z 3121. The welded joint is a TIG welded joint that can be formed with reduced occurrence of hot cracking during the welding process and has not only high strength but also excellent cryogenic impact toughness. Specifically, the yield strength (the 0.2% proof stress) and the tensile strength at room temperature (25° C.) of a weld metal prepared in accordance with the requirements specified in JIS Z 3111 are 400 MPa or more and 660 MPa or more, respectively, and the tensile strength of the welded joint at room temperature (25° C.) is 660 MPa or more. Furthermore, a weld metal and a welded heat affected zone of a welded joint prepared in accordance with the requirements specified in JIS Z 3128, and the steel material itself have an absorbed energy of 28 J or more in a Charpy impact test at a test temperature of −196° C.

[TIG Welding]

As already described, TIG welding is a process in which a metal is welded by melting a filler metal in an arc using a non-consumable tungsten electrode rod while blowing argon gas or helium gas to shield the welding from air. This TIG welding is applicable to various materials, such as alloy steels and non-ferrous metals, can further weld even complicated shapes, and offers excellent weld quality, thus being used in various metal welding applications.

For example, the TIG welding process is carried out in the following manner. Steel plates or steel materials (thickness: 3 to 100 mm) as a base material are butted against each other, and a 45° V-shaped groove is formed in accordance with JIS Z 3111. A pure tungsten rod (3.2 mm ϕ) as an electrode, and a filler metal (diameter: 2.0 mm ϕ) are in down-hand position. No preheating is performed. The base material is then welded under conditions with current: 180 to 250 A (DCEN), voltage: 10 to 15 V, welding speed: 5 to 15 cm/min, welding heat input: 0.7 to 4.0 kJ/mm, interpass temperature: 100 to 150° C., shield gas: Ar, and gas flow rate: 10 to 25 L/min.

[High-Mn Content Steel Materials]

First, the steel material that is used will be described. Incidentally, "%" in the "chemical composition" below means "mass %".

The steel material used in the disclosed embodiments is a high-Mn content steel material that has a chemical composition including C: 0.10 to 0.80%, Si: 0.05 to 1.00%, Mn: 18.0 to 30.0%, P: 0.030% or less, S: 0.0070% or less, Al: 0.010 to 0.070%, Cr: 2.5 to 7.0%, N: 0.0050 to 0.0500%, and O (oxygen): 0.0050% or less, the balance being Fe and incidental impurities. The reasons as to why the chemical composition is thus limited will be described below.

[C: 0.10 to 0.80%]

Carbon is an inexpensive and important element that acts to stabilize austenite phases and enhance cryogenic impact toughness. In order to obtain such effects, the C content needs to be 0.10% or more. Thus, the C content is limited to 0.10% or more. The C content is preferably 0.20% or more, more preferably 0.25% or more, still more preferably 0.30% or more, and most preferably 0.35% or more. If, on the other hand, the C content is more than 0.80%, Cr carbide is excessively formed to cause a decrease in cryogenic impact toughness. Thus, the C content is limited to 0.80% or less. The C content is preferably 0.75% or less, more preferably 0.70% or less, still more preferably 0.65% or less, and most preferably 0.63% or less.

[Si: 0.05 to 1.00%]

Silicon is an element that acts as a deoxidizing agent and contributes to increasing the strength of the steel material by being dissolved in the steel to effect solid solution hardening. In order to obtain such effects, the Si content needs to be 0.05% or more. Thus, the Si content is limited to 0.05% or more. The Si content is preferably 0.07% or more, more preferably 0.10% or more, still more preferably 0.15% or more, and most preferably 0.20% or more. If, on the other hand, the Si content is more than 1.00%, weldability is lowered. Thus, the Si content is limited to 1.00% or less. The Si content is preferably 0.80% or less, more preferably 0.70% or less, still more preferably 0.65% or less, and most preferably 0.50% or less.

[Mn: 18.0 to 30.0%]

Manganese is a relatively inexpensive element that acts to stabilize austenite phases. In the disclosed embodiments, this element is important for achieving high strength and excellent cryogenic impact toughness at the same time. In order to obtain such effects, the Mn content needs to be 18.0% or more. Thus, the Mn content is limited to 18.0% or more. The Mn content is preferably 20.0% or more, more preferably 22.0% or more, and still more preferably 24.0% or more. On the other hand, adding more than 30.0% manganese results in the saturation of the effect of enhancing the cryogenic impact toughness and is economically disadvantageous because the effect appropriate to the amount added cannot be expected. If, furthermore, the Mn content is as large as more than 30.0%, cuttability is lowered, and Mn segregation is promoted to increase the probability of the occurrence of stress corrosion cracking. Thus, the Mn content is limited to 30.0% or less. The Mn content is preferably 29.0% or less, more preferably 28.0% or less, and still more preferably 27.0% or less.

[P: 0.030% or Less]

Phosphorus is an element that is segregated as an impurity at grain boundaries to serve as origins of stress corrosion cracking. It is therefore desirable in the disclosed embodiments to remove as much phosphorus as possible. Up to 0.030% phosphorus is acceptable. Thus, the P content is limited to 0.030% or less. The P content is preferably 0.028% or less, more preferably 0.024% or less, still more preferably 0.020% or less, and most preferably 0.015% or less. Extreme dephosphorization to less than 0.002% entails prolonged refining and raises the refining cost. Thus, the P content is preferably 0.002% or more from an economical viewpoint.

[S: 0.0070% or Less]

In the steel, sulfur is present as sulfide inclusions and lowers the ductility and the cryogenic impact toughness of the steel material and the weld metal. It is therefore desirable to remove as much sulfur as possible. Up to 0.0070% sulfur is acceptable. Thus, the S content is limited to 0.0070% or less. The S content is preferably 0.0050% or less, and more preferably 0.0040% or less. Extreme desulfurization to less than 0.0005% entails prolonged refining and raises the refining cost. Thus, the S content is preferably 0.0005% or more from an economical viewpoint.

[Al: 0.010 to 0.070%]

Aluminum is an element that acts as a deoxidizing agent and is used most commonly in the molten steel deoxidizing process for steel materials. In order to obtain such an effect, the Al content needs to be 0.010% or more. Thus, the Al content is limited to 0.010% or more. The Al content is preferably 0.020% or more, and more preferably 0.030% or more. If, on the other hand, the Al content is more than 0.070%, aluminum is mixed into the weld metal portion during the welding process to cause a decrease in the toughness of the weld metal. Thus, the Al content is limited to 0.070% or less. The Al content is preferably 0.060% or less, and more preferably 0.050% or less.

[Cr: 2.5 to 7.0%]

Chromium is an element that stabilizes austenite phases and effectively contributes to enhancements in cryogenic impact toughness and steel material strength. Furthermore, this element is effective for forming fine crystal regions. In order to obtain such effects, the Cr content needs to be 2.5% or more. Thus, the Cr content is limited to 2.5% or more. The Cr content is preferably 3.0% or more, more preferably 3.3% or more, still more preferably 3.5% or more, and most preferably 4.0% or more. If, on the other hand, the Cr content is more than 7.0%, Cr carbide is formed to cause a decrease in cryogenic impact toughness and a decrease in stress corrosion cracking resistance. Thus, the Cr content is limited to 7.0% or less. The Cr content is preferably 6.8% or less, more preferably 6.5% or less, and still more preferably 6.0% or less.

[N: 0.0050 to 0.0500%]

Nitrogen is an element that acts to stabilize austenite phases, and effectively contributes to enhancing the cryogenic impact toughness. In order to obtain such effects, the N content needs to be 0.0050% or more. Thus, the N content is limited to 0.0050% or more. The N content is preferably 0.0060% or more, more preferably 0.0070% or more, and still more preferably 0.0080% or more. If, on the other hand, the N content is more than 0.0500%, nitrides or carbonitrides are coarsened to cause a decrease in cryogenic impact toughness. Thus, the N content is limited to 0.0500% or less. The N content is preferably 0.0400% or less, more preferably 0.0300% or less, and still more preferably 0.0200% or less.

[O (Oxygen): 0.0050% or Less]

In the steel, oxygen (O) is present as oxide inclusions and lowers the cryogenic impact toughness of the steel material. It is therefore desirable to remove as much oxygen (O) as possible. Up to 0.0050% oxygen is acceptable. Thus, the O (oxygen) content is limited to 0.0050% or less. The O content is preferably 0.0045% or less, and more preferably 0.0040% or less. Extreme deoxidation to an O (oxygen) content of less than 0.0005% entails prolonged refining and raises the refining cost. Thus, the O (oxygen) content is preferably 0.0005% or more from an economical viewpoint. The O content is more preferably 0.0006% or more.

[Composition of Optional Components]

The composition described above is the basic chemical composition. Where necessary, in addition to the basic chemical composition, the chemical composition may further include one, or two or more selected from Mo: 2.00% or less, V: 2.0% or less, and W: 2.00% or less, and may additionally include one or two selected from REM: 0.0010 to 0.0200% and B: 0.0005 to 0.0020%.

[Mo: 2.00% or Less, V: 2.0% or Less, and W: 2.00% or Less]

Molybdenum, vanadium, and tungsten are each an element that contributes to austenite phase stabilization and also contributes to enhancements in the strength and the cryogenic impact toughness of the steel material. One, or two or more may be selected and added as required. In order to obtain such effects, the Mo, V, and W contents are preferably each 0.001% or more. If, on the other hand, the Mo and W contents are each more than 2.00% and the V content is more than 2.0%, an increased amount of coarse carbonitrides are formed and serve as fracture origins to cause a decrease in cryogenic impact toughness. Thus, when molybdenum, vanadium, and tungsten are present, the contents are limited to Mo: 2.00% or less, V: 2.0% or less, and W: 2.00% or less. The contents are preferably Mo: 1.70% or less, V: 1.7% or less, and W: 1.70% or less, and more preferably Mo: 1.50% or less, V: 1.5% or less, and W: 1.50% or less.

[REM: 0.0010 to 0.0200% and B: 0.0005 to 0.0020%]

REM indicates rare earth metals, such as Sc, Y, La, and Ce. Through shape control for inclusions, these elements act to enhance the toughness of the steel material and to enhance the ductility and the sulfide stress corrosion cracking resistance. Boron is an element that is segregated at grain boundaries to contribute to enhancing the toughness of the steel material. One or two kinds of these elements may be selected and added as required.

In order to obtain the above effects, the REM content needs to be 0.0010% or more. Thus, when rare earth metals are present, the REM content is limited to 0.0010% or more. The REM content is preferably 0.0015% or more. If, on the other hand, the REM content is more than 0.0200%, the amount of nonmetallic inclusions is increased to cause decreases in toughness, ductility, and sulfide stress cracking resistance. Thus, when rare earth metals are present, the REM content is limited to 0.0200% or less. The REM content is preferably 0.0180% or less.

In order to obtain the effect described above, the B content needs to be 0.0005% or more. Thus, when B is present, the B content is limited to 0.0005% or more. The B content is preferably 0.0008% or more. If, on the other hand, the B content is more than 0.0020%, the amount of coarse nitride and carbide is increased to cause a decrease in toughness. Thus, when boron is present, the B content is limited to 0.0020% or less. The B content is preferably 0.0018% or less.

[Balance of the Composition]

The balance of the chemical composition described above is Fe and incidental impurities. Examples of the incidental impurities include Ca, Mg, Ti, Nb, and Cu. Up to 0.05% incidental impurities in total are acceptable. The steel material may contain elements other than those described above as long as the basic composition and the composition of the optional components described above are satisfied. Such embodiments are also within the technical scope of the disclosed embodiments.

[Methods for Producing High-Mn Content Steel Materials]

A preferred method for producing the high-Mn content steel materials used in the disclosed embodiments will be described.

Molten steel having the above-described steel composition is obtained by a common steelmaking process, such as a converter or an electric arc furnace, and is cast into a steel material, such as slab having a predetermined size, by a common casting process, such as a continuous casting process or an ingot making-slabbing process. It is needless to mention that the steel obtained by the steelmaking process may be subjected to secondary refining in, for example, a vacuum degassing furnace. The steel material obtained is further heated, hot-rolled, and then cooled to give a steel material of predetermined size. A steel material having excellent cryogenic impact toughness may be obtained by performing heating at a heating temperature in the range of 1100 to 1300° C., finishing hot rolling at a finishing delivery temperature of 790 to 980° C., and immediately subjecting the steel to post treatment, such as cooling. It is needless to mention that heat treatment, such as annealing treatment, may be further performed to control characteristics of the steel material.

[Characteristics of Steel Materials]

Preferred characteristics of the high-Mn content steel materials used in the disclosed embodiments will be described.

The steel material is preferably a cryogenic high-strength steel material that has the steel composition described above and that has a plate thickness of, for example, 6 to 100 mm, a yield strength (a 0.2% proof stress) of 400 MPa or more in a tensile test at room temperature (25° C.), and a Charpy impact absorbed energy $vE_{-196}$ of 28 J or more at a test temperature of −196° C. Furthermore, it is preferable that the tensile strength be 660 MPa or more. The tensile strength is more preferably 800 MPa or more.

[Weld Metals]

In the disclosed embodiments, workpieces of the high-Mn content steel material described above are welded together by TIG welding to form a welded joint that includes a weld metal portion composed of a single layer of a weld metal or a plurality of layers of a weld metal.

The weld metal of the disclosed embodiments has a basic chemical composition including C: 0.10 to 0.80%, Si: 0.05 to 1.00%, Mn: 15.0 to 30.0%, P: 0.030% or less, S: 0.030% or less, Al: 0.100% or less, Cr: 6.0 to 14.0%, and N: 0.100% or less, the balance being Fe and incidental impurities. The reasons as to why the chemical composition is thus limited will be described below.

[C: 0.10 to 0.80%]

Carbon is an element that acts to increase the strength of the weld metal by solid solution hardening. Furthermore, carbon is an inexpensive and important element that acts to stabilize austenite phases and enhance the cryogenic impact toughness of the weld metal. In order to obtain such effects, the C content needs to be 0.10% or more. Thus, the C content is limited to 0.10% or more. The C content is preferably 0.20% or more, and more preferably 0.25% or more. If, on the other hand, the C content is more than 0.80%, carbides are excessively formed in the weld metal to cause a decrease in cryogenic impact toughness and to increase the probability of hot cracking during the welding process. Thus, the C content is limited to 0.80% or less. The C content is preferably 0.75% or less, more preferably 0.70% or less, and most preferably 0.63% or less.

[Si: 0.05 to 1.00%]

Silicon acts as a deoxidizing agent to increase the yield of Mn, and also increases the viscosity of the molten metal to effectively allow a bead to maintain the shape stably. In order to obtain such effects, the Si content needs to be 0.05% or more. Thus, the Si content is limited to 0.05% or more. The Si content is preferably 0.10% or more, more preferably 0.15% or more, still more preferably 0.20% or more, and most preferably 0.25% or more. If, however, the Si content is more than 1.00%, the cryogenic impact toughness of the weld metal is lowered. Furthermore, silicon is segregated during solidification to form liquid phases at interfaces of solidified cells, causing a decrease in hot cracking resistance. Thus, the Si content is limited to 1.00% or less. The Si content is preferably 0.80% or less, more preferably 0.75% or less, and still more preferably 0.70% or less.

[Mn: 15.0 to 30.0%]

Manganese is an element that acts to stabilize austenite phases at low cost, and needs to be contained at 15.0% or more in the disclosed embodiments. If the Mn content is less than 15.0%, ferrite phases are formed in the weld metal to cause a significant decrease in cryogenic impact toughness. Thus, the Mn content is limited to 15.0% or more. The Mn content is preferably 17.0% or more, and more preferably 18.0% or more. If, on the other hand, the Mn content is more than 30.0%, manganese is segregated excessively during solidification to induce hot cracking. Thus, the Mn content is limited to 30.0% or less. The Mn content is preferably 28.0% or less, and more preferably 27.0% or less.

[P: 0.030% or Less]

Phosphorus is an element that is segregated at grain boundaries to induce hot cracking. It is therefore preferable in the disclosed embodiments to remove as much phosphorus as possible. Up to 0.030% phosphorus is acceptable. Thus, the P content is limited to 0.030% or less. The P content is preferably 0.020% or less, more preferably 0.018% or less, still more preferably 0.016% or less, and most preferably 0.014% or less. Extreme dephosphorization to less than 0.002% entails prolonged refining and raises the refining cost. Thus, the P content is preferably 0.002% or more from an economical viewpoint.

[S: 0.030% or Less]

In the weld metal, sulfur is present as sulfide inclusion MnS. MnS serves as fracture origins and lowers the cryogenic impact toughness. Thus, the S content is limited to 0.030% or less. The S content is preferably 0.025% or less, more preferably 0.020% or less, and still more preferably 0.017% or less. Excessive desulfurization raises the refining cost. Thus, the S content is preferably controlled to 0.001% or more.

[Al: 0.100% or Less]

Aluminum acts as a deoxidizing agent and has an important action to increase the viscosity of the molten metal and allow the bead shape to be maintained stably. Furthermore, aluminum narrows the temperature range of the solid-liquid coexistence region of the molten metal to contribute to the suppression of the occurrence of hot cracking in the weld metal. These effects are marked when the Al content is 0.001% or more. Thus, the Al content is preferably 0.001% or more. If, however, the Al content is more than 0.100%, the viscosity of the molten metal is so increased that a bead does not spread to increase the probability of defects, such as incomplete fusion. Thus, the Al content is limited to 0.100% or less. The Al content is preferably 0.060% or less, more preferably 0.050% or less, still more preferably 0.040% or less, and most preferably 0.030% or less.

[Cr: 6.0 to 14.0%]

Chromium is an element that stabilizes austenite phases to effectively contribute to enhancements in cryogenic impact toughness and weld metal strength. Furthermore, chromium narrows the temperature range of the solid-liquid coexistence region of the molten metal to effectively suppress the occurrence of hot cracking. Furthermore, chromium forms Cr phosphide in the liquid phase to suppress hot cracking caused by phosphorus. In order to obtain such effects, the Cr content needs to be 6.0% or more. If the Cr content is less than 6.0%, the above effects cannot be ensured. Thus, the Cr content is limited to 6.0% or more. The Cr content is preferably 6.5% or more, more preferably 7.0% or more, still more preferably 7.5% or more, and most preferably 8.0% or more. If, on the other hand, the Cr content is more than 14.0%, Cr carbide is formed to cause a decrease in cryogenic impact toughness. Thus, the Cr content is limited to 14.0% or less. The Cr content is preferably 13.0% or less, more preferably 12.0% or less, still more preferably 11.5% or less, and most preferably 11.0% or less.

[N: 0.100% or Less]

Nitrogen is an element that is incidentally mixed. Similarly to carbon, nitrogen effectively contributes to an enhancement in the strength of the weld metal and stabilizes austenite phases to contribute to a stable enhancement in cryogenic impact toughness. These effects are marked when the N content is 0.003% or more. Thus, the N content is preferably 0.003% or more, more preferably 0.004% or more, and still more preferably 0.006% or more. If, on the other hand, the N content is more than 0.100%, nitrides are formed to cause a decrease in low-temperature toughness. Thus, the N content is limited to 0.100% or less. The N content is preferably 0.080% or less, and more preferably 0.050% or less.

[Composition of Optional Components]

The composition described above is the basic chemical composition of the weld metal in the disclosed embodiments. Where necessary, in addition to the above chemical composition, the weld metal may further contain optional components, specifically, may selectively contain Mo: 3.50% or less and/or Ni: 10.00% or less, one, or two or more selected from V: 1.60% or less, Ti: 1.00% or less, Nb: 1.00% or less, and W: 1.00% or less, and one, or two or more selected from Cu: 1.00% or less, Ca: 0.010% or less, B: 0.010% or less, and REM: 0.020% or less.

[Mo: 3.50% or Less and Ni: 10.00% or Less]

Both molybdenum and nickel are elements that strengthen austenite grain boundaries. Either or both may be selected and added as required.

Molybdenum is an element that strengthens austenite grain boundaries, and is segregated at grain boundaries to enhance the strength of the weld metal. Furthermore, molybdenum also acts to enhance the strength of the weld metal by solid solution hardening. If, on the other hand, the Mo content is more than 3.50%, molybdenum is precipitated as carbide, which serves as fracture origins to cause a decrease in cryogenic impact toughness. Thus, when molybdenum is present, the Mo content is limited to 3.50% or less. The Mo content is preferably 3.20% or less, more preferably 3.00% or less, and still more preferably 2.50% or less.

Nickel is an element that strengthens austenite grain boundaries, and is segregated at grain boundaries to enhance the cryogenic impact toughness. Furthermore, nickel also has an effect of stabilizing austenite phases. Thus, an increase in the Ni content leads to stabilization of austenite phases and enhances the cryogenic impact toughness of the weld metal. In order to obtain such effects, the Ni content is preferably 0.01% or more, and more preferably 1.00% or more. However, increasing the Ni content in excess of 10.00% is economically disadvantageous because of the expensiveness of the element. Thus, when nickel is present, the Ni content is limited to 10.00% or less. The Ni content is preferably 8.00% or less, more preferably 7.00% or less, still more preferably 6.50% or less, and most preferably 6.00% or less.

[V: 1.60% or Less, Ti: 1.00% or Less, Nb: 1.00% or Less, and W: 1.00% or Less]

Vanadium, titanium, niobium, and tungsten are each an element that easily forms carbide and contributes to an enhancement in the strength of the weld metal. One, or two or more may be selected and added as required.

Vanadium is a carbide-forming element and is precipitated as fine carbide to contribute to an enhancement in the strength of the weld metal. In order to obtain such effects, the content of vanadium, when present, is preferably 0.001% or more. The V content is preferably 0.002% or more, and more preferably 0.005% or more. If, on the other hand, the V content is more than 1.60%, the carbide is coarsened and serves as fracture origins to cause a decrease in cryogenic impact toughness. Thus, when vanadium is present, the V content is limited to 1.60% or less. The V content is preferably 1.00% or less, more preferably 0.80% or less, still more preferably 0.60% or less, and most preferably 0.40% or less.

Titanium is a carbide-forming element and is precipitated as fine carbide to contribute to an enhancement in the strength of the weld metal. Furthermore, titanium is precipitated as carbide at interfaces of solidified cells of the weld metal, and thereby contributes to the suppression of the occurrence of hot cracking. In order to obtain such effects, the content of titanium, when present, is preferably 0.001% or more. The Ti content is more preferably 0.002% or more, and still more preferably 0.005% or more. If, on the other hand, the Ti content is more than 1.00%, the carbide is coarsened and serves as fracture origins to cause a decrease in cryogenic impact toughness. Thus, when titanium is present, the Ti content is limited to 1.00% or less. The Ti content is preferably 0.80% or less, more preferably 0.60% or less, and still more preferably 0.50% or less.

Niobium is a carbide-forming element and is precipitated as carbide to contribute to an enhancement in the strength of the weld metal. Furthermore, niobium is precipitated as carbide at interfaces of solidified cells of the weld metal, and thereby contributes to the suppression of the occurrence of hot cracking. In order to obtain such effects, the Nb content is preferably 0.001% or more. The Nb content is more preferably 0.002% or more, and still more preferably 0.005% or more. If, on the other hand, the Nb content is more than 1.00%, the carbide is coarsened and serves as fracture origins to cause a decrease in cryogenic impact toughness. Thus, when niobium is present, the Nb content is limited to 1.00% or less. The Nb content is preferably 0.80% or less, more preferably 0.60% or less, and most preferably 0.50% or less.

Tungsten is a carbide-forming element and is precipitated as carbide to contribute to an enhancement in the strength of the weld metal. Furthermore, tungsten contributes to the stabilization of austenite phases and enhances the cryogenic impact toughness. Furthermore, tungsten is precipitated as carbide at interfaces of solidified cells of the weld metal, and thereby contributes to the suppression of the occurrence of hot cracking. In order to obtain such effects, the W content is preferably 0.001% or more. The W content is more preferably 0.002% or more, and still more preferably 0.005% or more. If, on the other hand, the W content is more than 1.00%, the carbide is coarsened and serves as fracture origins to cause a decrease in cryogenic impact toughness. Thus, when tungsten is present, the W content is limited to 1.00% or less. The W content is preferably 0.80% or less, more preferably 0.60% or less, and still more preferably 0.40% or less.

[Cu: 1.00% or Less, Ca: 0.010% or Less, B: 0.010% or Less, and REM: 0.020% or Less]

Copper is an element that contributes to austenite stabilization. Calcium, boron, and rare earth metals are elements that contribute to workability enhancement. One, or two or more kinds of these elements may be selected and added as required.

Copper is an element that stabilizes austenite phases, and stabilizes austenite phases even at cryogenic temperatures to enhance the cryogenic impact toughness of the weld metal. In order to obtain such effects, the content of copper, when present, is preferably 0.01% or more. The Cu content is more preferably 0.04% or more. If, however, the Cu content is more than 1.00%, copper is segregated during solidification to induce hot cracking. Thus, when copper is present, the Cu content is limited to 1.00% or less. The Cu content is preferably 0.80% or less.

Calcium binds to sulfur in the molten metal to form the high-melting point sulfide CaS. CaS has a higher melting point than MnS and thus contributes to the suppression of the occurrence of hot cracking of the weld metal. These effects are marked when the Ca content is 0.001% or more. Thus, when calcium is present, the Ca content is preferably 0.001% or more. If, on the other hand, the Ca content is more than 0.010%, the arc is disturbed during the welding process to make it difficult to perform welding stably. Thus, when calcium is present, the Ca content is limited to 0.010% or less. The Ca content is preferably 0.008% or less, and more preferably 0.006% or less.

Boron is an element that is incidentally mixed, and is segregated at austenite grain boundaries. If more than 0.010% boron is mixed, boron nitride is formed at austenite grain boundaries to lower the strength, and further the boron nitride serves as fracture origins to cause a decrease in cryogenic impact toughness. Thus, when boron is present, the B content is limited to 0.010% or less. The B content is preferably 0.008% or less, and more preferably 0.005% or less. While the lower limit is not limited, excessive boron removal raises the refining cost. Thus, when boron is present, the B content is preferably 0.0001% or more.

Rare earth metals are powerful deoxidizing agents and are present in the form of REM oxides in the weld metal. The REM oxides serve as nucleus formation sites at the time of solidification, and thereby reduce the size of crystal grains and contribute to an enhancement in the strength of the weld metal. These effects are marked when the REM content is 0.001% or more. Thus, when rare earth metals are present, the REM content is preferably 0.001% or more. The REM content is more preferably 0.002% or more, and still more preferably 0.003% or more. If, however, the REM content is more than 0.020%, the arc stability is lowered. Thus, when rare earth metals are present, the REM content is limited to 0.020% or less. The REM content is preferably 0.018% or less, and more preferably 0.015% or less.

[Balance of the Composition]

The balance of the chemical composition described above is Fe and incidental impurities. Examples of the incidental impurities include H, O, Mg, Zn, and Re. Up to 0.0100% incidental impurities in total are acceptable. The weld metal may contain elements other than those described above as long as the basic composition and the composition of the optional components described hereinabove are satisfied. Such embodiments are also within the technical scope of the disclosed embodiments.

The chemical composition of the weld metal is mainly determined by the inflow proportions of the base metal and the welding material, such as a TIG welding filler metal (filler rod).

[Methods for Producing Welded Joints]

Next, a method for producing the welded joint according to the disclosed embodiments will be described.

First, workpieces of a high-Mn content steel material having the chemical composition described above are provided. Edge preparation is then performed so that the workpieces of the steel material provided will have a predetermined groove shape. The groove that is formed may have any shape without limitation. Examples include normal single V grooves, double V grooves, and double bevel grooves for welded steel structures that conform to JIS Z 3001-1.

Subsequently, the edge-prepared workpieces of the steel material are butted against each other, and a predetermined TIG welding filler metal (filler rod) is fed continuously. An arc is struck with a tungsten electrode rod to weld the workpieces while blowing an inert gas, thereby forming a weld metal. A welded joint is thus produced. The filler metal (diameter: 1.2 to 3.0 mmϕ) that is used may be filler metal that can form a weld metal having desired characteristics. The chemical composition of the filler metal is not particularly limited but is preferably such that, by mass %, C: 0.20 to 0.80%, Si: 0.20 to 1.00%, Mn: 16.0 to 30.0%, P: 0.030% or less, S: 0.030% or less, Cr: 6.0 to 15.0%, Mo: 0.01 to 4.0%, Ni: 0.01 to 9.0%, and N: 0.100% or less.

The heat-affected zone in the welded joint described hereinabove is a region that has been affected by the heat introduced during the welding process and has been denatured from the characteristics of the unaffected zone of the base material or the unaffected zone of the weld metal due to, for example, a change in crystal structure, the occurrence of new phases, a change in grain size, the diffusion of elements, or the recovery of dislocation. The reasons that give rise to a change in characteristics are not limited to those described above.

EXAMPLES

The disclosed embodiments will be further described below based on EXAMPLES. EXAMPLES below are only illustrative of detailed examples of the disclosed embodiments and are not intended to limit the scope of this disclosure.

Molten steels were obtained in a vacuum melting furnace, cast into a mold, and then bloomed into slabs (wall thickness: 150 mm) having a chemical composition described in Table 1. Steel materials were thus obtained. Next, the steel materials obtained were charged into a heating furnace, heated to 1250° C., hot rolled at a finishing delivery temperature of 850° C., and immediately water-cooled. Steel plates (high-Mn content steel materials) having a plate thickness of 12 mm were thus obtained.

Next, molten steels having a chemical composition described in Table 2 were obtained in a vacuum melting furnace and cast to give steel ingots weighing 1000 kg. The steel ingots obtained were heated to 1200° C., hot rolled, subsequently cold rolled, and optionally annealed (900 to 1200° C.) as required to give TIG welding filler metals (filler rods) having a diameter of 2.0 mmϕ and a length of 1000 mm.

Next, workpieces of the steel material obtained (plate thickness: 12 mm) were butted against each other, and a 45° single V groove was formed in accordance with JIS Z 3121. TIG welding was performed using the TIG welding filler metal (filler rod) as the welding material to form a weld metal in the groove. Welded joints were thus obtained. The combinations of the materials are described in Table 3. In the TIG welding, the filler metal (diameter: 2.0 mmϕ) having a composition described in Table 2 was fed in down-hand attitude, and the workpieces were welded without being preheated under conditions with current: 200 A (DCEN), voltage: 12 V, welding speed: 8 cm/min, interpass temperature: 100 to 150° C., and shield gas: Ar. The electrode was a pure tungsten rod (3.2 mmϕ).

[Evaluation of Characteristics of High-Mn Content Steel Materials]

Test pieces for tensile test in accordance with JIS Z 2241 and Charpy impact test specimens (V-notch) in accordance with JIS Z 2242 were taken from the high-Mn content steel materials obtained and were subjected to a tensile test and an impact test. In the tensile test, three test pieces were tested at room temperature, and the values obtained (0.2% proof stress) were averaged to give a tensile characteristic of the high-Mn content steel material. In the Charpy impact test, three test specimens were tested to measure the absorbed energy $vE_{-196}$ at a test temperature of −196° C., and the average of the results was taken as the cryogenic impact toughness of the high-Mn content steel material.

[Analysis of Components in Weld Metals]

To analyze the chemical composition of the weld metal, a sample was taken from a central portion of the weld metal and was analyzed to determine the components by a combustion-infrared absorption method, an inert gas fusion-thermal conductivity method, an inert gas fusion-infrared absorption method, an absorptiometric method, an ICP-AES method, a precipitation analysis method, a volumetric method, and a wet chemical analysis method.

[Evaluation of Hot Cracking Resistance]

After the welding process, a 10-mm thick macro test specimen was sampled from a central location in the weld line direction with a micro cutter in such a manner that a cross section perpendicular to the weld line would be observable. The cross section of the weld metal was observed with an optical microscope (×30) to determine the presence or absence of hot cracks. In the optical micrograph of the microstructure, elongated black regions 25 μm or more in width×80 μm or more in length were judged to be hot cracks. When hot cracks were present, the hot cracking resistance was low and was rated as "×". When there were no cracks, the hot cracking resistance was excellent and was rated as "○".

[Evaluation of Characteristics of Weld Metals]

The welded joints obtained were cut to give test pieces (diameter of parallel part: 6 mmϕ) for tensile test of the weld metal, and Charpy impact test specimens (V-notch) of the weld metal in accordance with the requirements specified in JIS Z 3111. The test pieces and the test specimens were subjected to a tensile test and an impact test. In the tensile test, three test pieces were tested at room temperature, and the values obtained (0.2% proof stress, tensile strength) were averaged to give a tensile characteristic of the weld metal of the welded joint. In the Charpy impact test, similarly, three test specimens were tested to measure the absorbed energy $vE_{-196}$ at a test temperature of −196° C., and the average of the results was taken as the cryogenic impact toughness of the weld metal of the welded joint. In the disclosed embodiments, as described hereinabove, the target values of 0.2% proof stress and tensile strength at room temperature are 400 MPa or more and 660 MPa or more, respectively. As described hereinabove, the target value of absorbed energy $vE_{-196}$ in the disclosed embodiments is 28 J or more.

[Evaluation of Characteristics of Welded Joints]

The welded joints obtained were tensile tested at room temperature in accordance with the requirements specified in JIS Z 3121. Test pieces were taken along a direction perpendicular to the weld axis so that the weld axis would be located at the center of the length in the parallel part of the test piece. The thickness of the test piece was equal to the total thickness of the welded joint. That is, the test pieces were test pieces No. 1A. Three test pieces were tested, and the results obtained were averaged to give a tensile characteristic of the welded joint. In the disclosed embodiments, as described hereinabove, the target value of tensile strength at room temperature is 660 MPa or more.

Furthermore, Charpy impact test specimens (V-notch) were taken from the welded heat affected zones and were impact tested in accordance with the requirements specified in JIS Z 3128. The test specimens were V-notched in a direction perpendicular to the surface of the base material. The test specimens were taken from a location at the middle of the plate thickness, corresponding to the center of the weld metal, and 1 mm from the fusion line. Three test specimens were tested to determine the absorbed energy $vE_{-196}$ at a test temperature of −196° C., and the average of the results was taken as the cryogenic impact toughness of the welded heat affected zone. As described hereinabove, the target value of absorbed energy $vE_{-196}$ in the disclosed embodiments is 28 J or more.

The results obtained are described in Tables 1 to 4.

TABLE 1

| Steel materials Nos. | Chemical compositions of steel materials (mass %) C | Si | Mn | P | S | Al | Cr | N | O | Mo, V, W, REM, B | 0.2% Proof stress (MPa) | Absorbed energy $vE_{-196}$ (J) | Remarks |
|---|---|---|---|---|---|---|---|---|---|---|---|---|---|
| A | 0.42 | 0.33 | 25.6 | 0.004 | 0.0033 | 0.040 | 4.7 | 0.0079 | 0.0018 | — | 453 | 199 | Compliant steel |

TABLE 1-continued

| Steel materials Nos. | C | Si | Mn | P | S | Al | Cr | N | O | Mo, V, W, REM, B | 0.2% Proof stress (MPa) | Absorbed energy $vE_{-196}$ (J) | Remarks |
|---|---|---|---|---|---|---|---|---|---|---|---|---|---|
| | Chemical compositions of steel materials (mass %) | | | | | | | | | | | | |
| B | 0.55 | 0.46 | 18.3 | 0.003 | 0.0011 | 0.051 | 3.2 | 0.0061 | 0.0024 | — | 465 | 189 | Compliant steel |
| C | 0.68 | 0.77 | 21.0 | 0.011 | 0.0061 | 0.016 | 2.8 | 0.0116 | 0.0014 | Mo: 1.20, W: 0.40, B: 0.0018 | 460 | 135 | Compliant steel |
| D | 0.21 | 0.62 | 28.8 | 0.011 | 0.0020 | 0.041 | 6.6 | 0.0134 | 0.0023 | V: 0.01 | 426 | 207 | Compliant steel |
| E | 0.58 | 0.13 | 22.2 | 0.026 | 0.0028 | 0.049 | 3.1 | 0.0143 | 0.0040 | REM: 0.0018 | 410 | 114 | Compliant steel |
| F | 0.49 | 0.62 | 17.4 | 0.011 | 0.0029 | 0.041 | 5.6 | 0.0220 | 0.0043 | — | 389 | 127 | Comparative steel |

The underlines indicate being outside of the range of the disclosed embodiments.

TABLE 2

| Filler metals Nos. | C | Si | Mn | P | S | Cr | N | Mo | Ni | Al | V, Ti, Nb, W | Cu, Ca, REM, B |
|---|---|---|---|---|---|---|---|---|---|---|---|---|
| | Chemical compositions of filler metals (mass %) | | | | | | | | | | | |
| sa | 0.50 | 0.73 | 19.0 | 0.017 | 0.015 | 8.6 | 0.039 | 0.43 | 1.89 | — | W: 0.003 | — |
| sb | 0.22 | 0.88 | 24.4 | 0.002 | 0.002 | 7.9 | 0.046 | — | — | — | — | — |
| sc | 0.27 | 0.45 | 28.1 | 0.007 | 0.009 | 8.7 | 0.081 | 2.31 | 2.95 | — | Nb: 1.67 | Ca: 0.004 |
| sd | 0.77 | 0.53 | 19.9 | 0.003 | 0.021 | 14.2 | 0.058 | 1.40 | 8.94 | 0.006 | V: 0.002, Nb: 0.03 | — |
| se | 0.63 | 0.21 | 28.4 | 0.002 | 0.004 | 12.0 | 0.004 | 1.09 | 5.39 | — | — | Cu: 0.01, B: 0.014 |
| sf | 0.58 | 0.74 | 19.8 | 0.013 | 0.024 | 9.7 | 0.084 | 2.47 | 3.53 | — | Ti: 1.22, Nb: 0.01 | REM: 0.001 |
| sg | 0.66 | 0.21 | 27.8 | 0.011 | 0.015 | 8.4 | 0.080 | 1.07 | 0.46 | 0.026 | W: 0.010, Ti: 0.02 | — |
| sh | 0.21 | 0.60 | 21.4 | 0.010 | 0.012 | 6.9 | 0.014 | 0.55 | 1.51 | 0.035 | — | Cu: 0.02, REM: 0.002 |
| si | 0.32 | 0.71 | 19.3 | 0.007 | 0.006 | 7.4 | 0.086 | 0.66 | 1.56 | — | V: 2.34 | — |
| sj | 0.55 | 0.44 | 21.3 | 0.020 | 0.011 | 8.8 | 0.022 | 1.54 | 6.55 | — | — | Cu: 1.88, B: 0.010 |
| sk | 0.72 | 0.70 | 25.3 | 0.004 | 0.005 | 8.4 | 0.084 | 2.74 | 1.99 | — | — | REM: 0.004, B: 0.013 |
| sl | 0.45 | 0.47 | 27.0 | 0.018 | 0.011 | 7.5 | 0.020 | 0.28 | 0.27 | 0.010 | W: 0.008, Ti: 0.01 | — |
| sm | 0.28 | 0.82 | 10.3 | 0.01 | 0.020 | 9.6 | 0.004 | 2.42 | 0.59 | — | — | — |
| sn | 0.16 | 0.61 | 24.5 | 0.002 | 0.009 | 4.2 | 0.049 | 0.49 | 1.64 | 0.008 | Nb: 0.08 | B: 0.021 |
| so | 0.70 | 0.41 | 21.1 | 0.067 | 0.075 | 11.8 | 0.062 | 1.40 | 6.78 | 0.015 | Nb: 0.04 | — |
| sp | 1.03 | 0.68 | 26.4 | 0.024 | 0.017 | 8.8 | 0.024 | 0.19 | 2.48 | — | — | Cu: 0.03 |
| sq | 0.45 | 0.24 | 35.9 | 0.012 | 0.003 | 8.9 | 0.012 | 2.17 | 3.62 | 0.021 | — | Ca: 0.005, B: 0.009 |
| sr | 0.13 | 0.58 | 25.2 | 0.009 | 0.016 | 22.3 | 0.089 | 1.12 | 5.30 | — | — | — |

TABLE 3

| Welded joints Nos. | Steel materials Nos. | Filler metals Nos. | C | Si | Mn | P | S | Al | Cr | N | Mo | Ni | V, Ti, Nb, W | Cu, Ca, B, REM | Remarks |
|---|---|---|---|---|---|---|---|---|---|---|---|---|---|---|---|
| | | | Chemical compositions of weld metals (mass %) | | | | | | | | | | | | |
| 1 | A | sa | 0.47 | 0.60 | 20.3 | 0.013 | 0.013 | 0.009 | 7.5 | 0.031 | 0.34 | 1.30 | W: 0.001 | — | EX. |
| 2 | A | sb | 0.26 | 0.66 | 24.2 | 0.002 | 0.002 | 0.017 | 6.9 | 0.038 | — | — | — | — | EX. |
| 3 | A | sc | 0.30 | 0.37 | 26.7 | 0.006 | 0.008 | 0.009 | 7.9 | 0.056 | 1.88 | 2.38 | Nb: 0.87 | Ca: 0.002 | EX. |
| 4 | A | sd | 0.69 | 0.42 | 20.5 | 0.003 | 0.018 | 0.016 | 12.7 | 0.044 | 1.06 | 7.64 | V: 0.002, Nb: 0.01 | — | EX. |
| 5 | A | se | 0.60 | 0.19 | 27.1 | 0.003 | 0.004 | 0.008 | 10.3 | 0.005 | 0.72 | 4.02 | — | Cu: <0.01, B: 0.009 | EX. |
| 6 | A | sf | 0.54 | 0.59 | 21.1 | 0.011 | 0.018 | 0.007 | 8.7 | 0.071 | 1.89 | 2.41 | Ti: 0.74, Nb: <0.01 | REM: <0.001 | EX |
| 7 | A | sg | 0.61 | 0.19 | 26.8 | 0.010 | 0.013 | 0.030 | 7.1 | 0.067 | 0.80 | 0.38 | W: 0.004, Ti: 0.01 | — | EX |
| 8 | A | sh | 0.22 | 0.47 | 21.6 | 0.008 | 0.009 | 0.036 | 6.2 | 0.013 | 0.45 | 1.21 | — | Cu: 0.01, REM: 0.001 | EX. |
| 9 | A | si | 0.34 | 0.54 | 20.6 | 0.006 | 0.005 | 0.009 | 6.5 | 0.067 | 0.50 | 1.08 | V: 1.37 | — | EX. |
| 10 | A | sj | 0.52 | 0.35 | 21.6 | 0.017 | 0.010 | 0.011 | 7.5 | 0.017 | 1.11 | 4.58 | — | Cu: 0.92, B: 0.005 | EX. |
| 11 | A | sk | 0.64 | 0.52 | 24.8 | 0.004 | 0.004 | 0.013 | 7.6 | 0.064 | 2.24 | 1.67 | — | REM: 0.003, B: 0.009 | EX. |
| 12 | A | sl | 0.44 | 0.37 | 26.0 | 0.015 | 0.009 | 0.016 | 6.8 | 0.016 | 0.23 | 0.23 | W: 0.003, Ti: <0.01 | — | EX. |

TABLE 3-continued

| Welded joints Nos. | Steel materials Nos. | Filler metals Nos. | Chemical compositions of weld metals (mass %) C | Si | Mn | P | S | Al | Cr | N | Mo | Ni | V, Ti, Nb, W | Cu, Ca, B, REM | Remarks |
|---|---|---|---|---|---|---|---|---|---|---|---|---|---|---|---|
| 13 | A | sm | 0.31 | 0.65 | 12.6 | 0.008 | 0.017 | 0.013 | 8.5 | 0.005 | 1.87 | 0.44 | — | — | COMP. EX. |
| 14 | A | sn | 0.22 | 0.48 | 24.2 | 0.003 | 0.007 | 0.019 | 4.4 | 0.040 | 0.39 | 1.34 | Nb: 0.06 | B: 0.016 | COMP. EX. |
| 15 | A | so | 0.62 | 0.33 | 21.8 | 0.056 | 0.059 | 0.020 | 10.2 | 0.048 | 1.05 | 5.14 | Nb: 0.02 | — | COMP. EX. |
| 16 | A | sp | 0.87 | 0.52 | 25.6 | 0.020 | 0.015 | 0.012 | 7.8 | 0.020 | 0.15 | 2.04 | — | Cu: 0.02 | COMP. EX. |
| 17 | A | sq | 0.44 | 0.19 | 32.7 | 0.010 | 0.003 | 0.027 | 7.6 | 0.011 | 1.69 | 2.83 | — | Ca: 0.003, B: 0.004 | COMP. EX. |
| 18 | A | sr | 0.21 | 0.44 | 24.7 | 0.008 | 0.012 | 0.008 | 19.5 | 0.068 | 0.88 | 4.44 | — | — | COMP. EX. |
| 19 | B | sa | 0.51 | 0.63 | 18.2 | 0.014 | 0.012 | 0.014 | 7.4 | 0.032 | 0.35 | 1.56 | W: 0.001 | — | EX. |
| 20 | B | sb | 0.28 | 0.70 | 22.6 | 0.002 | 0.002 | 0.022 | 6.8 | 0.037 | — | — | Nb: 0.02 | Cu: <0.01 | EX. |
| 21 | B | sc | 0.33 | 0.39 | 24.3 | 0.006 | 0.008 | 0.015 | 7.3 | 0.060 | 1.73 | 2.04 | Nb: 0.79 | Ca: 0.003 | EX. |
| 22 | B | sm | 0.32 | 0.70 | 12.4 | 0.009 | 0.014 | 0.008 | 8.3 | 0.004 | 1.74 | 0.44 | — | — | COMP. EX. |
| 23 | B | sn | 0.23 | 0.52 | 22.5 | 0.002 | 0.007 | 0.019 | 4.0 | 0.034 | 0.40 | 1.34 | Nb: 0.06 | B: 0.014 | COMP. EX. |
| 24 | C | sa | 0.55 | 0.68 | 18.8 | 0.016 | 0.013 | 0.014 | 6.6 | 0.030 | 0.68 | 1.60 | W: 0.24 | B: <0.001 | EX. |
| 25 | C | sb | 0.30 | 0.79 | 23.3 | 0.003 | 0.003 | 0.021 | 6.5 | 0.037 | 0.38 | 0.01 | W: 0.13, Nb: 0.03 | Cu: <0.01 | EX. |
| 26 | C | sn | 0.25 | 0.58 | 23.0 | 0.004 | 0.008 | 0.016 | 4.0 | 0.036 | 0.73 | 1.31 | W: 0.28, Nb: 0.05 | B: 0.015 | COMP. EX. |
| 27 | D | sa | 0.43 | 0.64 | 21.0 | 0.015 | 0.013 | 0.011 | 8.2 | 0.035 | 0.35 | 1.29 | V: 0.004, W: 0.002 | — | EX. |
| 28 | D | sb | 0.21 | 0.77 | 24.8 | 0.004 | 0.002 | 0.019 | 7.6 | 0.036 | — | — | V: 0.004, Nb: 0.03 | Cu: 0.01 | EX. |
| 29 | D | sn | 0.17 | 0.55 | 24.8 | 0.004 | 0.008 | 0.015 | 5.0 | 0.041 | 0.33 | 1.20 | V: 0.003, Nb: 0.01 | Ca: 0.003, B: 0.010 | COMP. EX. |
| 30 | E | sa | 0.52 | 0.53 | 19.2 | 0.018 | 0.013 | 0.012 | 6.9 | 0.069 | 0.30 | 1.56 | W: 0.002 | REM: 0.0011 | EX. |
| 31 | E | sb | 0.28 | 0.69 | 23.3 | 0.008 | 0.002 | 0.023 | 6.6 | 0.077 | — | — | Nb: 0.03 | Cu: 0.01, REM: 0.0012 | EX. |
| 32 | E | sn | 0.24 | 0.40 | 23.2 | 0.007 | 0.008 | 0.021 | 3.9 | 0.064 | 0.41 | 1.39 | Nb: 0.02 | Ca: 0.002, REM: 0.0012, B: 0.008 | COMP. EX. |
| 33 | F | sa | 0.50 | 0.64 | 18.2 | 0.015 | 0.012 | 0.011 | 8.1 | 0.035 | 0.35 | 1.33 | W: 0.003 | Cu: <0.01 | COMP. EX.* |
| 34 | F | sb | 0.30 | 0.75 | 21.6 | 0.004 | 0.002 | 0.019 | 7.5 | 0.039 | — | — | Nb: 0.05 | Cu: 0.01 | COMP. EX.* |
| 35 | F | sc | 0.34 | 0.42 | 23.5 | 0.008 | 0.007 | 0.009 | 7.7 | 0.061 | 1.69 | 2.11 | Nb: 0.82 | Cu: <0.01, Ca: 0.003 | COMP. EX.* |

*The composition of the base material is outside of the range of the disclosed embodiments.
The underlines indicate being outside of the range of the disclosed embodiments.

TABLE 4

| Welded joints Nos. | Steel materials Nos. | Filler metals Nos. | Hot cracking resistance | 0.2% Proof stress of weld metal (MPa) | Tensile strength of weld metal (MPa) | Tensile strength of welded joint (MPa) | Absorbed energy of weld metal $vE_{-196}$ (J) | Absorbed energy of heat-affected zone $vE_{-196}$ (J) | Remarks |
|---|---|---|---|---|---|---|---|---|---|
| 1 | A | sa | ○ | 449.3 | 746.2 | 779.2 | 44.3 | 38.0 | EX. |
| 2 | A | sb | ○ | 417.9 | 695.8 | 702.1 | 45.9 | 68.5 | EX. |
| 3 | A | sc | ○ | 470.2 | 798.7 | 820.8 | 50.7 | 64.9 | EX. |
| 4 | A | sd | ○ | 556.9 | 818.2 | 845.9 | 85.3 | 73.7 | EX. |
| 5 | A | se | ○ | 502.8 | 779.3 | 808.0 | 73.7 | 64.2 | EX. |
| 6 | A | sf | ○ | 493.8 | 788.6 | 785.1 | 49.0 | 69.5 | EX. |
| 7 | A | sg | ○ | 432.8 | 712.8 | 750.1 | 40.3 | 68.1 | EX. |
| 8 | A | sh | ○ | 412.1 | 702.4 | 752.3 | 43.9 | 39.6 | EX. |
| 9 | A | si | ○ | 420.9 | 694.8 | 731.3 | 37.6 | 56.2 | EX. |
| 10 | A | sj | ○ | 488.3 | 775.8 | 793.6 | 63.5 | 59.9 | EX. |
| 11 | A | sk | ○ | 459.0 | 780.4 | 829.5 | 54.6 | 74.7 | EX. |
| 12 | A | sl | ○ | 419.2 | 706.6 | 747.5 | 41.6 | 62.1 | EX. |
| 13 | A | sm | ○ | 463.1 | 739.9 | 796.1 | 22.8 | 74.6 | COMP. EX. |
| 14 | A | sn | x | 368.1 | 628.3 | 648.0 | 21.0 | 66.2 | COMP. EX. |
| 15 | A | so | x | 564.7 | 833.6 | 861.3 | 4.9 | 68.2 | COMP. EX. |
| 16 | A | sp | x | 471.1 | 767.0 | 777.2 | 22.2 | 57.3 | COMP. EX. |
| 17 | A | sq | x | 469.8 | 726.5 | 789.6 | 47.8 | 36.3 | COMP. EX. |
| 18 | A | sr | ○ | 482.0 | 780.1 | 803.9 | 3.3 | 54.4 | COMP. EX. |
| 19 | B | sa | ○ | 451.0 | 754.6 | 787.6 | 45.8 | 37.8 | EX. |
| 20 | B | sb | ○ | 415.7 | 692.8 | 739.5 | 45.3 | 39.4 | EX. |
| 21 | B | sc | ○ | 451.4 | 733.7 | 750.1 | 42.1 | 42.9 | EX. |
| 22 | B | sm | ○ | 457.7 | 756.3 | 762.5 | 24.6 | 62.9 | COMP. EX. |
| 23 | B | sn | x | 358.5 | 635.3 | 635.7 | 25.7 | 48.2 | COMP. EX. |
| 24 | C | sa | ○ | 431.8 | 757.1 | 760.9 | 43.4 | 58.3 | EX. |
| 25 | C | sb | ○ | 406.5 | 683.0 | 692.8 | 43.7 | 58.6 | EX. |
| 26 | C | sn | x | 358.9 | 633.8 | 652.6 | 24.9 | 48.7 | COMP. EX. |
| 27 | D | sa | ○ | 466.4 | 785.2 | 811.8 | 46.1 | 56.3 | EX. |

TABLE 4-continued

| Welded joints Nos. | Steel materials Nos. | Filler metals Nos. | Hot cracking resistance | 0.2% Proof stress of weld metal (MPa) | Tensile strength of weld metal (MPa) | Tensile strength of welded joint (MPa) | Absorbed energy of weld metal $vE_{-196}$ (J) | Absorbed energy of heat-affected zone $vE_{-196}$ (J) | Remarks |
|---|---|---|---|---|---|---|---|---|---|
| 28 | D | sb | ○ | 432.9 | 757.4 | 753.3 | 47.5 | 48.9 | EX. |
| 29 | D | sn | x | 382.0 | 640.0 | 652.5 | 27.2 | 57.0 | COMP. EX. |
| 30 | E | sa | ○ | 437.6 | 724.5 | 767.1 | 43.9 | 43.2 | EX. |
| 31 | E | sb | ○ | 409.7 | 745.3 | 827.6 | 44.9 | 73.4 | EX. |
| 32 | E | sn | x | 357.7 | 622.2 | 647.8 | 25.1 | 46.2 | COMP. EX. |
| 33 | F | sa | ○ | 465.9 | 741.3 | 779.3 | 46.4 | 12.4 | COMP. EX. |
| 34 | F | sb | ○ | 433.3 | 727.9 | 752.1 | 46.9 | 14.2 | COMP. EX. |
| 35 | F | sc | ○ | 463.1 | 791.1 | 835.6 | 49.1 | 11.8 | COMP. EX. |

The underlines indicate being outside of the range of the disclosed embodiments.

In all EXAMPLES, the welded joints were excellent in hot cracking resistance and suffered no hot cracks during the welding process.

In all EXAMPLES, furthermore, the welded joints attained high strength and excellent cryogenic impact toughness. Specifically, the weld metals had a yield strength (a 0.2% proof stress) of 400 MPa or more and a tensile strength of 660 MPa or more at room temperature; the heat-affected zones in the welded joints had a tensile strength of 660 MPa or more at room temperature; and the weld metals and the welded heat affected zones had an absorbed energy $vE_{-196}$ of 28 J or more in the Charpy impact test at a test temperature of −196° C.

In COMPARATIVE EXAMPLES falling outside the scope of the disclosed embodiments, the welded joints failed to achieve high strength and excellent cryogenic impact toughness at the same time because the hot cracking resistance was low, and the welded joint suffered hot cracks; because the weld metal had a yield strength (a 0.2% proof stress) of less than 400 MPa or a tensile strength of less than 660 MPa at room temperature; or because the weld metal or the welded heat affected zone had an absorbed energy $vE_{-196}$ of less than 28 J in the Charpy impact test at a test temperature of −196° C.

In the welded joints Nos. 13 and 22 representing COMPARATIVE EXAMPLES, the Mn content in the weld metal was below the range of the disclosed embodiments, and the austenite stability in the weld metal was low. As a result, excellent cryogenic impact toughness that was desired was not obtained and the absorbed energy in the Charpy impact test at a test temperature of −196° C. was less than 28 J.

In the welded joints Nos. 14, 23, 26, 29, and 32 representing COMPARATIVE EXAMPLES, the Cr content in the weld metal was below the range of the disclosed embodiments, and consequently the weld metal had a 0.2% proof stress of less than 400 MPa and a tensile strength of less than 660 MPa, and the joint had a tensile strength of less than 660 MPa, thus failing to achieve desired high strength. Furthermore, phosphorus was segregated into the last-solidified region during the welding process, thus causing hot cracks. Furthermore, excellent cryogenic impact toughness that was desired was not obtained and the absorbed energy $vE_{-196}$ of the weld metal at a test temperature of −196° C. was less than 28 J.

In the welded joint No. 15 representing a COMPARATIVE EXAMPLE, the P content in the weld metal was above the range of the disclosed embodiments, and phosphorus was segregated into the last-solidified region of the weld metal, thus causing hot cracks. Furthermore, the S content in the weld metal was above the range of the disclosed embodiments, and MnS possibly serving as fracture origins was precipitated. As a result, excellent cryogenic impact toughness that was desired was not obtained and the absorbed energy in the Charpy impact test at a test temperature of −196° C. was less than 28 J.

In the welded joint No. 16 representing a COMPARATIVE EXAMPLE, the C content in the weld metal was above the range of the disclosed embodiments, and consequently carbides were formed in the weld metal to cause hot cracks. Furthermore, the carbides served as fracture origins. As a result, excellent cryogenic impact toughness that was desired was not obtained and the absorbed energy in the Charpy impact test at a test temperature of −196° C. was less than 28 J.

In the welded joint No. 17 representing a COMPARATIVE EXAMPLE, the Mn content in the weld metal was above the range of the disclosed embodiments, and manganese was segregated into the last-solidified region during the welding process, thus causing hot cracks.

In the welded joint No. 18 representing a COMPARATIVE EXAMPLE, the Cr content in the weld metal was above the range of the disclosed embodiments, and consequently Cr carbide possibly serving as fracture origins was precipitated in the weld metal. As a result, excellent cryogenic impact toughness that was desired was not obtained and the absorbed energy in the Charpy impact test at a test temperature of −196° C. was less than 28 J.

In the welded joints Nos. 33, 34, and 35 representing COMPARATIVE EXAMPLES, the Mn content in the steel material was below the range of the disclosed embodiments, and the austenite phases in the steel material were unstable. As a result, excellent cryogenic impact toughness that was desired was not obtained and the welded heat affected zone had an absorbed energy of less than 28 J in the Charpy impact test at a test temperature of −196° C.

The invention claimed is:

1. A TIG welded joint in a high-Mn content steel material, the high-Mn content steel material having a chemical composition comprising, by mass %, C: 0.10 to 0.80%, Si: 0.05 to 1.00%, Mn: 18.0 to 30.0%, P: 0.030% or less, S: 0.0070% or less, Al: 0.010 to 0.070%, Cr: 2.5 to 7.0%, N: 0.0050 to 0.0500%, O: 0.0050% or less, and the balance being Fe and incidental impurities, the TIG welded joint comprising a weld metal having a chemical composition comprising, by mass %:

C: 0.10 to 0.80%;

Si: 0.05 to 1.00%;

Mn: 15.0 to 30.0%;

P: 0.030% or less;

S: 0.030% or less;

Al: 0.100% or less;
Cr: greater than 6.0% and less than or equal to 14.0%;
N: 0.100% or less; and
the balance being Fe and incidental impurities.

2. The TIG welded joint according to claim 1, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

3. The TIG welded joint according to claim 1, wherein the chemical composition of the high-Mn content steel material further comprises at least one group selected from the following groups:

Group A: at least one selected from the group consisting of, by mass %, Mo: 2.00% or less, V: 2.0% or less, and W: 2.00% or less, and Group B: at least one selected from the group consisting of, by mass %, REM: 0.0010 to 0.0200% and B: 0.0005 to 0.0020%.

4. The TIG welded joint according to claim 3, wherein the high-Mn content steel material has a yield strength of 400 MPa or more in a tensile test at room temperature and a Charpy impact absorbed energy $vE_{-196}$ of 28 J or more at a test temperature of −196° C.

5. The TIG welded joint according to claim 4, wherein the chemical composition of the weld metal further comprises at least one group selected from the following groups:

Group C: at least one selected from the group consisting of, by mass %, Mo: 3.50% or less, and Ni: 10.00% or less, Group D: at least one selected from the group consisting of, by mass %, V: 1.60% or less, Ti: 1.00% or less, Nb: 1.00% or less, and W: 1.00% or less, and Group E: at least one selected from the group consisting of, by mass %, Cu: 1.00% or less, Ca: 0.010% or less, B: 0.010% or less, and REM: 0.020% or less.

6. The TIG welded joint according to claim 5, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

7. The TIG welded joint according to claim 4, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

8. The TIG welded joint according to claim 3, wherein the chemical composition of the weld metal further comprises at least one group selected from the following groups:

Group C: at least one selected from the group consisting of, by mass %, Mo: 3.50% or less, and Ni: 10.00% or less, Group D: at least one selected from the group consisting of, by mass %, V: 1.60% or less, Ti: 1.00% or less, Nb: 1.00% or less, and W: 1.00% or less, and Group E: at least one selected from the group consisting of, by mass %, Cu: 1.00% or less, Ca: 0.010% or less, B: 0.010% or less, and REM: 0.020% or less.

9. The TIG welded joint according to claim 8, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

10. The TIG welded joint according to claim 3, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

11. The TIG welded joint according to claim 1, wherein the high-Mn content steel material has a yield strength of 400 MPa or more in a tensile test at room temperature and a Charpy impact absorbed energy $vE_{-196}$ of 28 J or more at a test temperature of −196° C.

12. The TIG welded joint according to claim 11, wherein the chemical composition of the weld metal further comprises at least one group selected from the following groups:

Group C: at least one selected from the group consisting of, by mass %, Mo: 3.50% or less, and Ni: 10.00% or less, Group D: at least one selected from the group consisting of, by mass %, V: 1.60% or less, Ti: 1.00% or less, Nb: 1.00% or less, and W: 1.00% or less, and Group E: at least one selected from the group consisting of, by mass %, Cu: 1.00% or less, Ca: 0.010% or less, B: 0.010% or less, and REM: 0.020% or less.

13. The TIG welded joint according to claim 12, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

14. The TIG welded joint according to claim 11, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

15. The TIG welded joint according to claim 1, wherein the chemical composition of the weld metal further comprises at least one group selected from the following groups:

Group C: at least one selected from the group consisting of, by mass %, Mo: 3.50% or less, and Ni: 10.00% or less, Group D: at least one selected from the group consisting of, by mass %, V: 1.60% or less, Ti: 1.00% or less, Nb: 1.00% or less, and W: 1.00% or less, and Group E: at least one selected from the group consisting of, by mass %, Cu: 1.00% or less, Ca: 0.010% or less, B: 0.010% or less, and REM: 0.020% or less.

16. The TIG welded joint according to claim 15, wherein the weld metal has a yield strength of 400 MPa or more and a tensile strength of 660 MPa or more in a tensile test at room temperature, the TIG welded joint has a tensile strength of 660 MPa or more at room temperature, and the weld metal and a heat-affected zone in the TIG welded joint have a Charpy impact absorbed energy $vE_{-196}$ of 28 J or more at a test temperature of −196° C.

* * * * *